(12) United States Patent
Lin

(10) Patent No.: US 6,602,378 B2
(45) Date of Patent: Aug. 5, 2003

(54) PROCESS OF PRODUCING A 3D (DIMENSION) STEREO FLASH BRIGHT COLOR PLASTIC SHEET

(75) Inventor: Tai-Hsiung Lin, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 17 days.

(21) Appl. No.: 09/800,973

(22) Filed: Mar. 8, 2001

(65) Prior Publication Data

US 2002/0127373 A1 Sep. 12, 2002

(51) Int. Cl.[7] .............................. B32B 31/00; B31F 1/22; C04B 41/00
(52) U.S. Cl. .................. 156/277; 156/209; 264/132; 264/257
(58) Field of Search .................. 428/156, 172, 428/195, 206, 207, 542.2; 156/277, 196, 209, 297; 264/257, 129, 132, 241

(56) References Cited

U.S. PATENT DOCUMENTS 4,127,693 A * 11/1978 Lemelson .................. 428/167
5,254,390 A * 10/1993 Lu .............................. 428/167
5,624,732 A   4/1997 Oshima et al.
5,723,200 A   3/1998 Oshima et al.

* cited by examiner

*Primary Examiner*—Donald J. Loney
(74) *Attorney, Agent, or Firm*—Dickstein Shapiro Morin & Oshinsky LLP

(57) ABSTRACT

The present invention is a process and its product by embossing or processing the transparent soft or solid thermoplastic polyvinyl chloride(PVC) sheet, the thermoplastic polyethylene(PE) film sheet, the ethylenevinyl acetate copolymer(EVA) film sheet, and the PEVA(the mixture) film sheet; and more particularly a product by utilizing said thermoplastic material plastic sheet printed by lithographic or gravure printing; whereon a pattern arranged by a computer is printed. The plastic sheet is further embossed by a embossing machine on both front and rear sides to produce a coordinated indension so as to produce a product with a stereo flash effect.

19 Claims, 6 Drawing Sheets

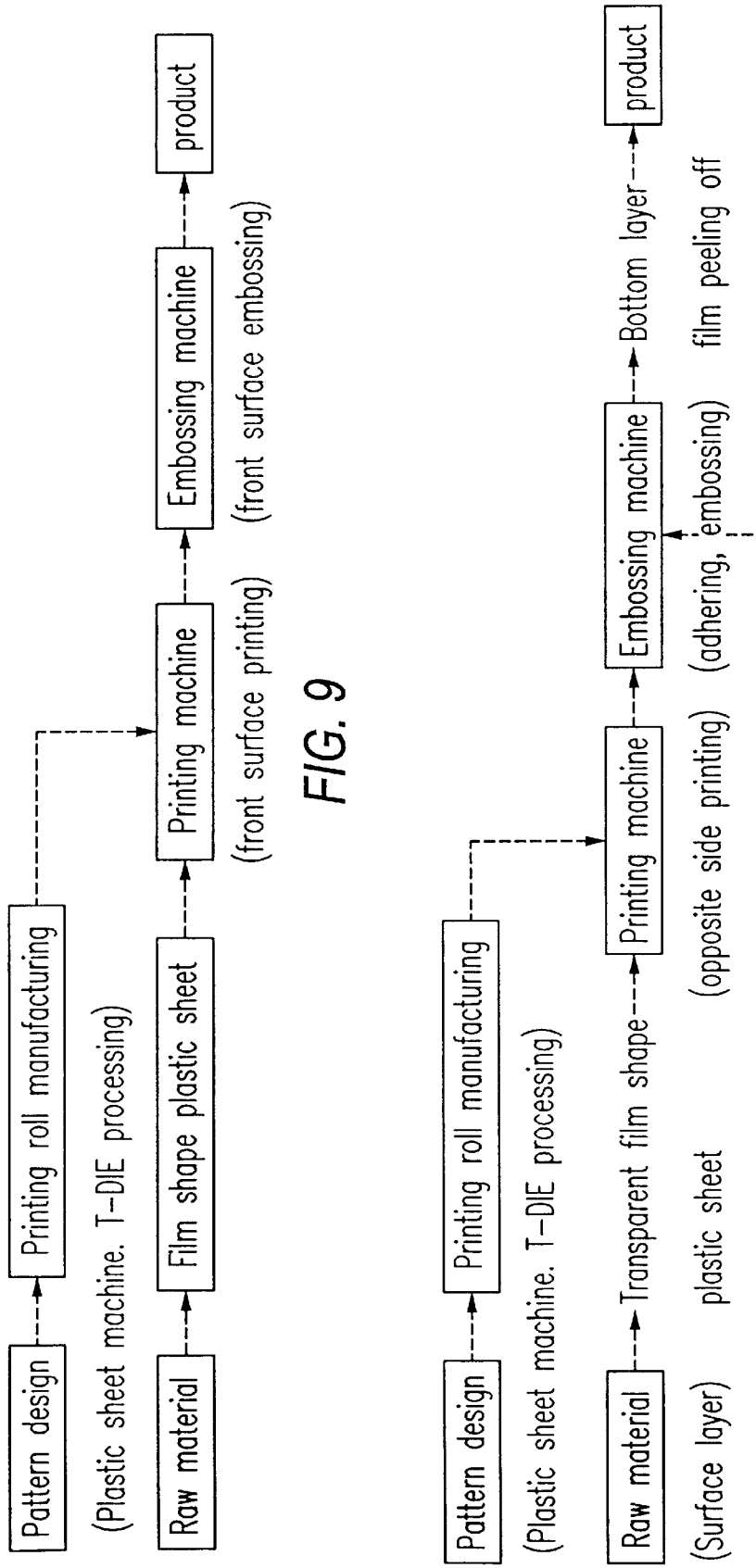

PROCESS OF PRODUCING A 3D (DIMENSION) STEREO FLASH BRIGHT COLOR PLASTIC SHEET

BACKGROUND OF THE INVENTION

Description of the Related Art

1. The prior 3D (Dimension) stereo effect printed product has been practiced in the market for many years; which, however, is confined to the production of small piece packaged embossing technique whereby a plastic laminate is printed and embossed by way of checkered plate or lithographic plate. The said process suffers with a low producing efficiency and extraordinary high cost due to its not being able to be industrially mass produced.
2. Or produced by way of continuous embossing, transmitting printing, and scrolling packaging:
   (1). U.S. Pat. No. 5,624,732 discloses a process; whereby a transmitting material is printed at first, and then the pattern is transmitted to the main material by heated embossing. The said process, which utilizes adherence and transmitted printing, is apt to suffer a low rate of acceptance as a result of an inferior productivity and stability caused by either the bubbles existing between the plastic sheet and the adhered material, or not being able to transmit the pattern completely, or the wrinkles for not having the same heated extension with various materials despite of its possessing less problem of extension and shrinkage whereof.
   (2). U.S. Pat. No. 5,723,200 discloses a process; whereby either a sense of visual stereo is created by rotating the printed points of transparent convex lens shape to certain angles in order to produce interposition with embossed points, or various changing effects of product are produced by utilizing a technique of pressing and embossing multiple adhered layers.

BRIEF SUMMARY OF THE INVENTION

The present invention improves the defect of the conventional small piece package stereo effect embossed product of not being able to be industrially mass produced, whereby to develop a new process which utilizes the plastic sheet embossed molding machine, printing machine, embossing machine to process and produce the plastic sheet product which is applied to shower curtain, table cloth, dinning pad or further to adhere to a bottom cloth which turns out to be a plastic skin with bottom cloth which can be applied in making new product such as bag, shoes, and miscellaneous processing and so on which, however, can not confine the scope of the present invention.

The present invention utilizes a wide range scroll packaged plastic sheet (24"~76") and applies four kinds of process to produce the needed 3D(Dimension) stereo flash bright color plastic sheet and plastic skin adhered with a bottom cloth in accordance with kinds of plastic sheet (or plastic skin) of different materials whose extension and shrinkage rate being calculated by computer and in accordance with different vision effects caused by different printing and embossed pattern design.

The present invention achieves the effects of 3D stereo and flash changing color by selectively using plain roll-up packaged plastic sheet made of various thermoplastic material (PVC, EVA, PE, etc.) through a process of plastic squeezing out, Calender, and T-die; wherewith the coordinated techniques of print and emboss roll are utilized. In the past, the printing and embossing of plastic sheet made of PET, PVC could merely create a 2D visual effect, generally. The present invention is invented in the purpose of producing an innovated product, of a sense of stereo stratification, and of a capability of industrial mass production. The process of the present invention uses various thermoplastic plastic sheet (24"~76"), the front side is printed with a pattern which is arranged by a computer thereof, a lithographic or gravure printing are utilized therewith, the coordinated indention is embossed by an embossing machine at the front or the rear side thereof(depending on the acquired effect) in accordance with the molding temperature (For instance, the soft PVC plastic sheet is within 140° C.~180° C.) of various materials. The product obtains a 3D stereo and different stratification, color, and depth changing effect.

While the present invention selectively uses various kinds of thermoplastic plastic sheet with the rear side being printed and the front side being embossed or with the front side being printed and the rear side being embossed, the thermoplastic materials such as PVC, PE, EVA utilize PET material as an dielectric between the big preheating roll of embossing machine and the printed side of the plastic sheet in order to increase brightness of plastic sheet and to prevent the peel off of printing ink so as to stick to the preheating roll and in order to decrease the stretch of plastic sheet which contribute to a more steady mass production. The said present invention is completely different from the technique of said U.S. Pat. No. 5,624,732.

The present invention utilizes the stretch ratio of plastic sheet in accordance with designed printed points which coordinate with embossed points. The method is to set the difference of stretch ratio between top, bottom, left, and right in order to create the interference between the checkered points of print and emboss which causes interposition so as to produce an effect of stereo. The advantage of the said method is the easiness of combining pattern units, and the flexibility of industrial mass production thereof without the confinement of not being easy to produce caused by the rotation of printed points. The said producing method is completely different from the technique of said U.S. Pat. No. 5,723,200 as well.

S: plastic sheet

L: indention

P: pitch of indention and print

C1 and C2: print color (for instance: C1 is red, C2 is blue)

Figure 2:
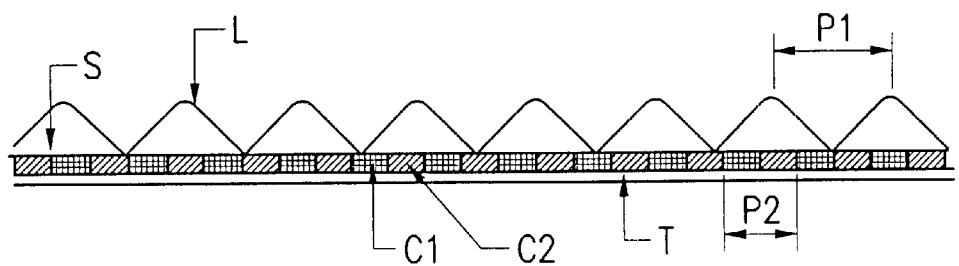

FIG. 2 shows a section of the product with straight line rear side printing and straight line front side embossing.

S: plastic sheet

L: indention

C1 and C2: print color (for instance: C1 is red, C2 is blue)

P1: pitch of indention

P2: pitch of print

T: material of dielectric

Figure 3:
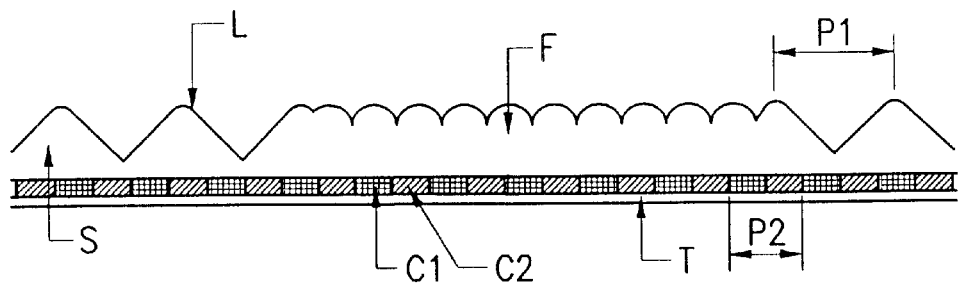

FIG. 3 shows a section of the product with straight line opposite side printing and straight line plus pattern indention design front side embossing.

S: plastic sheet

L: straight strip convex shape indention

C1 and C2: print color (for instance: C1 is red, C2 is blue)

F: mist point shape indention

Figure 4:
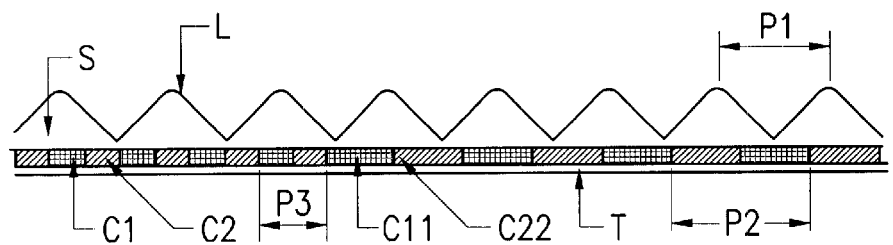
Figure 5:
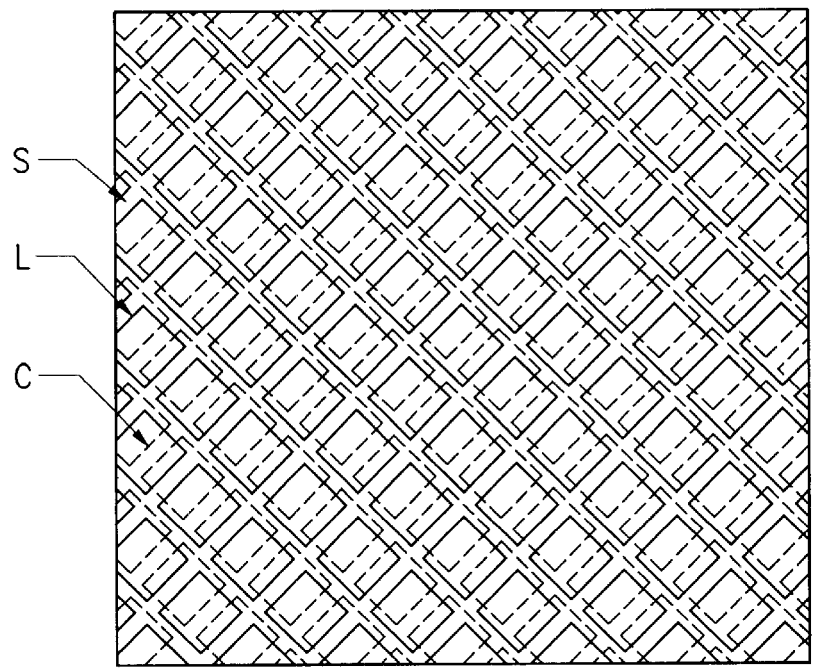
Figures 1, 5:
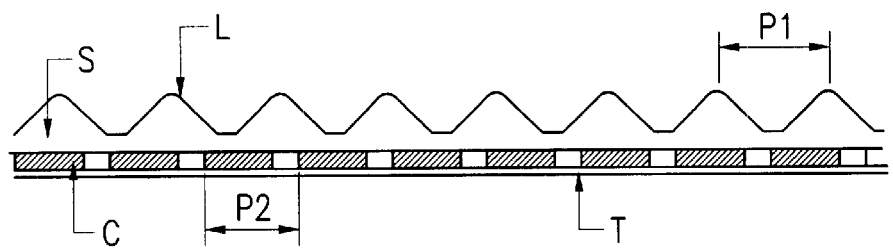
Figure 6:
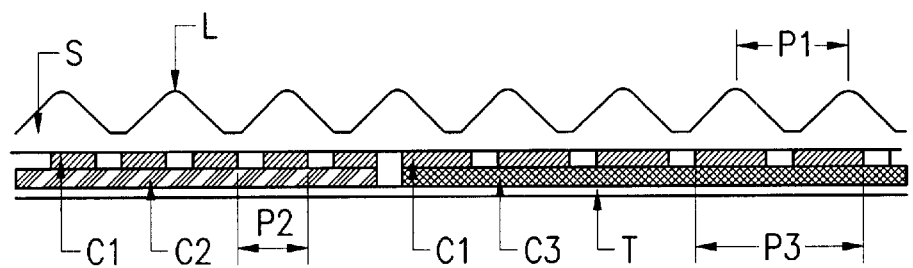
Figure 7:
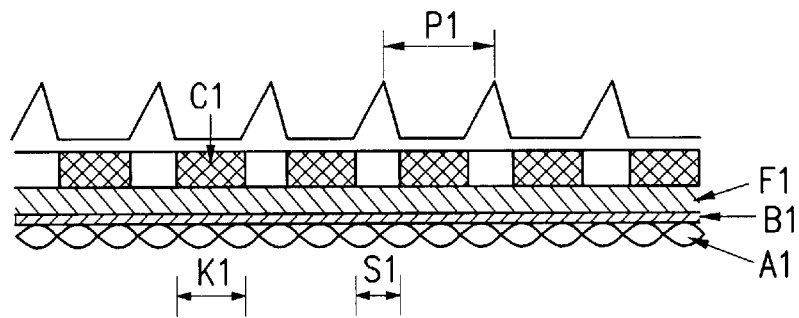
Figure 8:
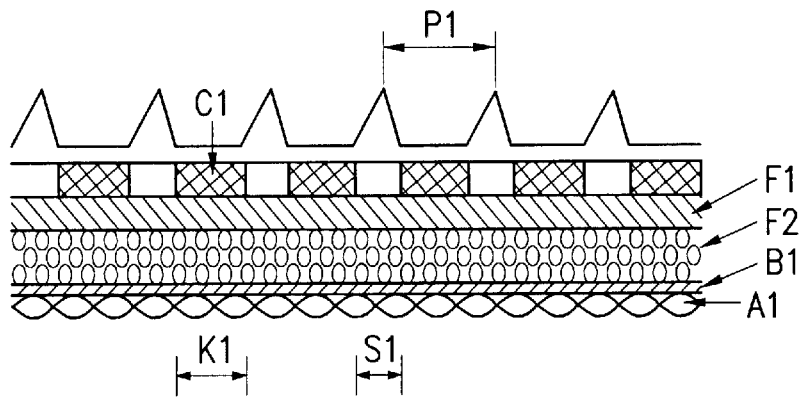
Figure 11:
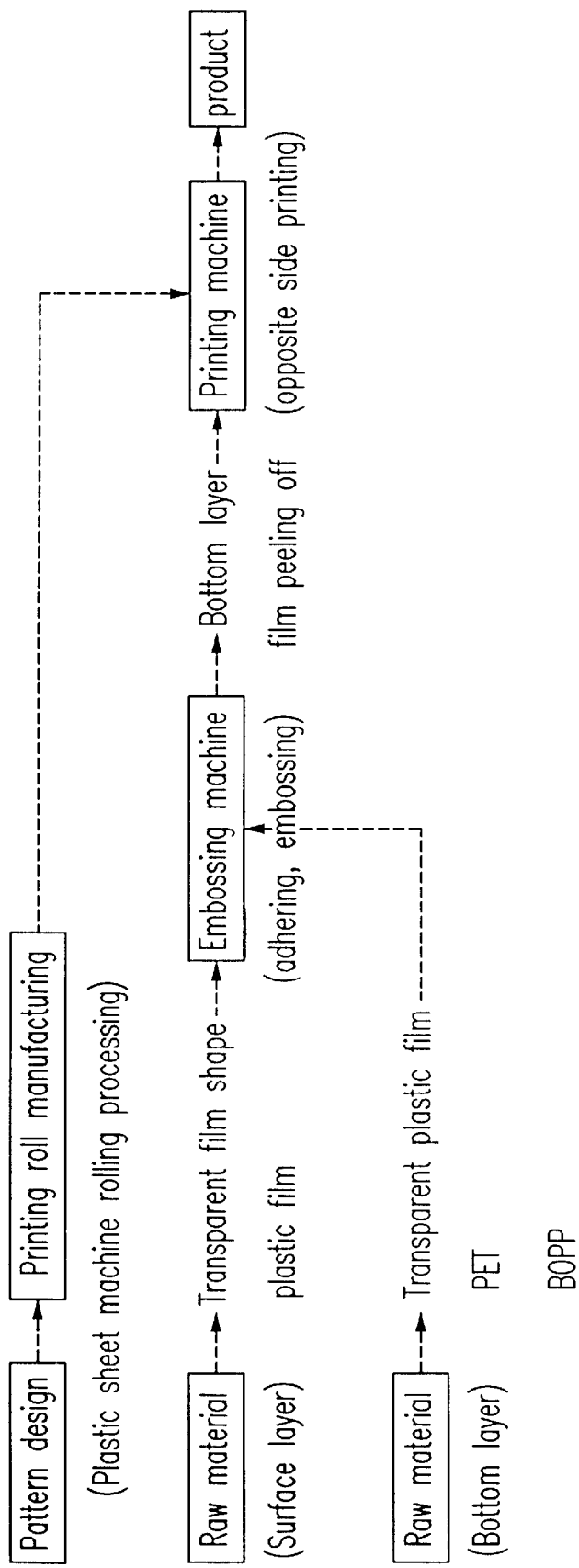
Figure 12:
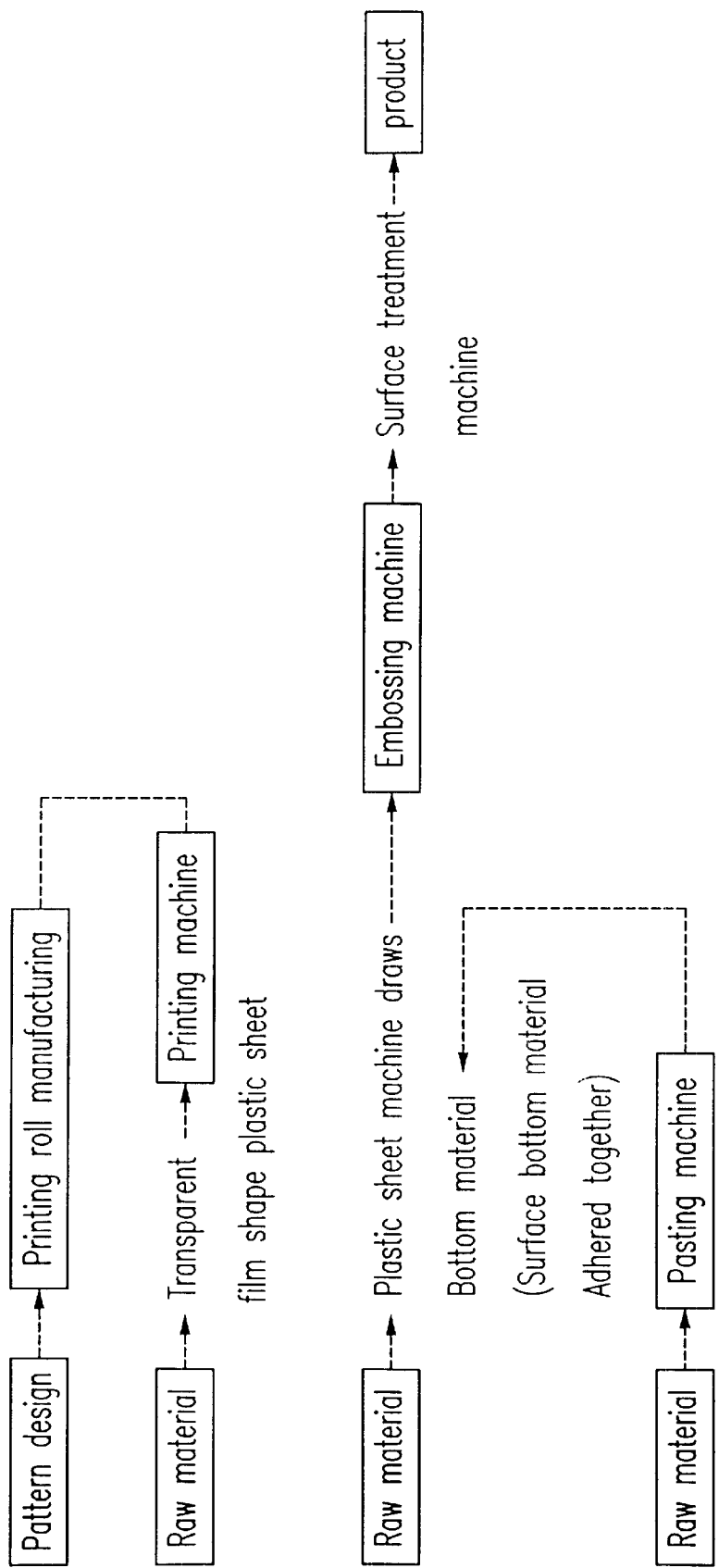

P1: pitch of indention
P2: pitch of print
T: material of dielectric
FIG. 4 shows a section of the product with straight line plus pattern indention design opposite side printing and straight line front side embossing.
S: plastic sheet
L: indention
C1 and C2: print color
C11 and C22: print color
P1: pitch of indention
P2: pitch of print
T: material of dielectric
FIG. 5 shows a section of the product with point shape opposite side printing and point shape front side embossing.
S: plastic sheet
L: point shape indention
C: point shape printing
FIG. 5.1 shows a section of the product with point shape opposite side printing and point shape front side embossing.
S: plastic sheet
L: point shape indention
C: point shape printing
P1: point pitch of indention
P2: point pitch of printing
T: material of dielectric
FIG. 6 shows a section of the product with point shape plus pattern indention design opposite side printing and point shape front side embossing.
S: plastic sheet
L: point shape indention
C1: printing point
C2 and C3: printing color block pattern (not printing point)
P1: point pitch of indention
P2 and P3: point pitch of printing
T: material of dielectric
FIG. 7 shows a section of the product of 3D stereo plastic skin.
C1: printing color
P1: point pitch of indention
K1: diameter of printing circle point
S1: pitch of printing circle point
F1: bottom layer of plastic skin
B1: paste layer
A1: bottom cloth
FIG. 8 shows a section of the product of 3D stereo foam plastic skin.
C1: printing color
P1: point pitch of indention
K1: diameter of printing circle point
S1: pitch of printing circle point
F1: bottom layer of plastic skin
B1: paste layer
F2: foam layer
A1: bottom cloth
FIG. 9 shows a flow diagram for Process I;
FIG. 10 shows a flow diagram for Process II;
FIG. 11 shows a flow diagram for Process III;
FIG. 12 shows a flow diagram for Process IV.

DETAILED DESCRIPTION OF THE INVENTION

The present invention utilizes the following four processes whereby various kinds of thermoplastic plastic sheet such as PVC, PE, etc., which is produced by way of thermoplastic molding, is produced to be a product of 3D stereo effect printed emboss transparent plastic sheet.

FIG. 9 shows a flow diagram of the first process, designated Process I.

The trait of the process of the invention is the front side printing and the front side embossing.

The invention uses three kinds of film plastic sheet: the materials are thermoplastic polyvinyl chloride (solid and soft) sheet, the thermoplastic polyethylene(PE) sheet, the ethylenevinyl acetate copolymer(EVA) sheet or the PEVA (the mixture) sheet, and the other kinds of transparent resin are all included in the scope of application of this case.

The used specification is: 0.10 mm~1.0 mm of thickness, 24"~76" of width.

(A). Description of the process of producing film plastic sheet of this invention: The thermoplastic polyvinyl chloride transparent sheet (solid and soft) is made from PVC powder, plasticizer, stabilizer, and dye, which are mixed by a specific proportion thereof, through an appropriate mix-refined molding machine (such as rolling machine) to have the said polyvinyl chloride mixture therein be completely plasticized and melted; a calender (160° C.~240° C.) with a controlled roll clearance thereof is utilized thereafter to obtain a soft film plastic sheet with acquired thickness.

(B). The thermoplastic polyethylene(PE) film sheet, the ethylenevinyl acetate copolymer(EVA) film sheet and the PEVA(the mixture) film sheet are made from PE granules, EVA granules, or PEVA proportional granules (single or various proportional mixtures). Through an appropriate producing machine (such as rolling machine, blowing machine), the said PE granules, EVA granules, or PEVA proportional granules are completely plasticized and melted; the soft polyethylene(PE) film sheet, the ethylenevinyl acetate copolymer(EVA) film sheet and the PEVA film sheet can be obtained with an acquired thickness thereafter by way of molding machine such as T-Die.

(C). Description of the pattern design, plate making, and producing process (a). Brief Description of Pattern Design The invention utilizes the computer software to set the required ratio of stretch and shrinkage of the plastic sheet during printing and embossing stage in accordance with the acquired effect of the designed product pattern, and to design various printing checkered points or lines which are in compliance with those acquired so as to coordinate with the indent of embossing stage; whereby to create an effect of stratified depth stereo sense and of bright color changing in accordance with different viewing angles. Consequently, a product with a stability of mass production and with an effect of innovated 3D can be achieved.

Printing checkered points can vary with pattern and indention width. In general, 60~200 lpi (Line per inch) is a suitable range of printing. The size of embossing indention's pitch varies with the thickness of plastic sheet. In general, 15~80 lpi is selected to match 0.1~1.0 mm of thickness.

(b). Production of Printing Roll: A Lithographic or Gravure Printing Can Be Used, However, the Gravure Printing Has a Better Effect in the Process of the Invention. Brief Described as Follows (b1). Roll's production by corrosion: (plate making without connection seam requirement) A calculated file is output to a plate making negative film which is directly wrapped to a printing copper roll coated with sensitive liquid; the sensitive liquid is burned to attach thereon; moreover, corrosion liquid molds the printing points onto copper roll.

(b2). Roll's production by electric sculpture: (plate making with connection seam requirement) The plate script file directly sculptures the pattern on printing copper roll by utilizing an electric sculpture machine (b3). Printing, embossing process: The molded thermoplastic polyvinyl chloride(PVC) sheet, or the thermoplastic polyethylene(PE) sheet, or the ethylenevinyl acetate copolymer(EVA) sheet, or the PEVA(the mixture) sheet is printed the printing pattern on the front side thereon by the printing machine (Gravure printing machine, OFF SET printing machine) through the above said (C) printing roll produced in the printing plate design process; which is heated thereafter (for example, the soft PVC plastic sheet being heated to 140° C.~180° C.) by embossing machine to make soft of the said printed thermoplastic plastic sheet; by utilizing convex lens lengthy shape or semisphere shape embossing roll to emboss thereon so as to obtain a product of the present invention which is a 3D stereo effect print emboss transparent plastic sheet with equal pitch convex lens lengthy shape or semisphere indention on the product surface.

FIG. 10 shows a flow diagram of the second process, designated Process II.

The trait of the process of the invention is the front side printing, the front side embossing.

The suitable transparent film plastic sheet of the invention is the same with that described in Process I.

Description of pattern design, printing plate making, and producing process:

(A). Pattern design is the same with that described in Process I.

(B). Production of printing roll is the same with that described in Process I.

(C). Process of printing, and embossing

The thermoplastic polyvinyl chloride PVC (soft, and solid) transparent plastic sheet, or the thermoplastic polyethylene(PE) transparent plastic sheet, or the ethylenevinyl acetate copolymer(EVA) transparent plastic sheet, and the PEVA(the mixture) transparent plastic sheet (whose thickness is 0.1~3.0 mm, and width is 24"~76"), which is one example of various kinds of suitable material, is used as a surface layer material; the said PVC, PE, EVA, PEVA transparent plastic sheet is printed the printing pattern on the rear (opposite) side thereon by the printing machine (Gravure printing machine, OFF SET printing machine) through the above said (1) (C) printing roll produced in the printing plate design process; the coordinated transparent plastic film (PET, BOPP) with a thickness of 0.012~0.075 mm and a width of 24"~78" is used as a bottom layer material; the embossing machine preheats so as to adhere the surface layer material and the bottom layer material to each other, further raises the temperature to 140° C.~180° C.; an embossing roll with convex lens lengthy shape or semisphere shape is utilized to emboss thereupon so as to have the surface of the surface layer material obtain a 3D stereo effect print emboss transparent plastic sheet with equal pitch convex lens lengthy shape or semisphere indention thereon.

FIG. 11 shows a flow diagram of the first process, designated Process III.

The trait of this invention is the process of producing 3D stereo effect of the solid plastic sheet.

This invention uses the transparent film plastic sheet; a sample material is the thermoplastic polyvinyl chloride solid plastic sheet. (Specification: thickness 0.10 mm~3.0 mm, width 24"~76".)

(A). The thermoplastic polyvinyl chloride transparent solid PVC plastic sheet is made from PVC powder, less amount of plasticizer, stabilizer, and dye, which are mixed by a specific proportion thereof, through an appropriate mix-refined molding machine (such as rolling machine) to have the said polyvinyl chloride mixture therein be completely plasticized and melted; a calender (160° C.~240° C.) with a controlled gear clearance thereof is utilized thereafter to obtain a solid laminate PVC plastic sheet with acquired thickness.

(B). Description of pattern design, printing plate making, and producing process of this invention:

(a). Pattern design is the same with that of Process I.

(b). Printing roll producing is the same with that of Process I.

(c). Printing process, embossing process:

The thermoplastic polyvinyl chloride transparent solid PVC plastic sheet is coordinated with transparent plastic film (PET, BOPP) with a thickness of 0.075 mm~0.12 mm and a width of 24"~78" as a bottom layer material; an embossing roll with convex lens lengthy shape or semisphere shape is utilized to emboss thereupon so as to have the surface of the surface layer material obtain a 3D stereo effect print emboss transparent plastic sheet with equal pitch convex lens lengthy shape or semisphere indention thereon. Concurrently, the bottom layer material and the surface layer material shall be peeled off by a peeling off machine before rolling up or be peeled off by another process; the peeled off surface material passes through the said printing roll produced by the process in the said (B). printing plate making design. The printing pattern is printed on the rear (opposite) side of the said peeled off surface layer material through printing machine (Gravure printing machine, OFF SET printing machine) thereafter so as to make the product a 3D stereo effect print emboss transparent plastic sheet, which is the product of the invention.

FIG. 12 shows a flow diagram of the first process, designated Process IV.

The trait of this invention is the process of producing the 3D stereo effect of latex (skin).

(A). The film plastic sheet used in this invention is the thermoplastic polyvinyl chloride plastic sheet made from PVC powder, plasticizer, stabilizer, and dye, which are mixed by a specific proportion thereof; through an appropriate mix-refined molding machine, the polyvinyl chloride mixture therein shall be completely plasticized and melted; the polyvinyl chloride plastic sheet of a required specification of 0.10~0.60 mm×24"~76" is obtained through pressing of a plastic sheet machine with a temperature of 150° C.~200° C. under the width and thickness controll, which is further printed by gravure printing to become a printed transparent plastic sheet as a semi-product. Moreover, the plastic sheet machine draws the polyvinyl chloride plastic sheet bottom material out of the said proportional mixture; the bottom material drawn out of the plastic sheet machine itself, the transparent print plastic sheet, and the adhesive sheet are adhered concurrently at adhering stage of the plastic sheet machine thereafter; the 3D sense PVC plastic skin product can be obtained through further embossing, surface treatment, and product inspection.

(B). Description of pattern design, printing plate making, and producing process of this invention: (the same with those of Process I)

(a). Printing roll producing: (the same with those of Process I)

(b). Process of adhering, embossing, and surface treatment:
- (b 1). The thermoplastic polyvinyl chloride PVC transparent plastic sheet is printed to be a transparent printing plastic sheet by gravure printing machine at the said printing roll in above said(a), (b);
- (b2). Furthermore, the thermoplastic polyvinyl chloride PVC, plasticizer, stabilizer, and dye are mixed at a specific proportion thereof and refined by a mixing machine, and a universal horsepower machine; the mixture, after being plasticized, is molded (thickness, width) and adhered to an adhesive bottom sheet by a plastic sheet machine;
- (b3). The transparent printing plastic sheet obtained from the said (b1) is further concurrently adhered to the adhesive sheet which has already adhered to PVC in (b2). In other words, it is needed to adhere the PVC layer, which was mix-refined at the front stage of plastic sheet machine process, at the rear stage of plastic sheet machine process. Besides, the adhesive sheet and transparent printing plastic sheet need concurrently to be adhered completely at adhering stage; the said semi-product is thereafter molded and embossed by the embossing machine (150° C.~180° C.) with a selected properly designed embossing roll in coordination with the design of printint roll. Furthermore, after a proper surface treatment, the product of this invention is obtained.

The preferred embodiments of the invention:

The following embodiments shall further describe this invention, however, shall not be used to confine the scope of this invention.

Embodiment 1

Figure 1:
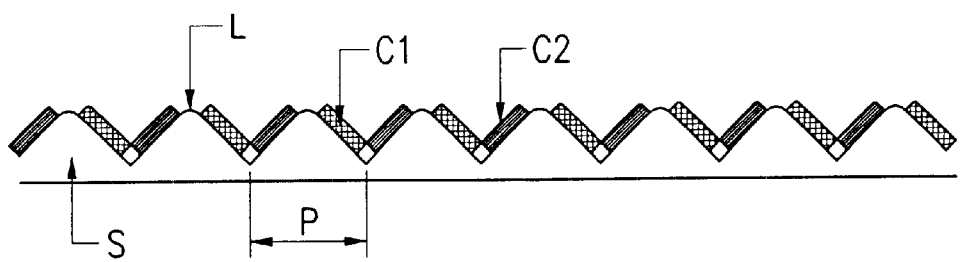
FIG. 1 shows a section of the product with straight line front side printing and straight line front side embossing.

1. The raw materials PVC powder, plasticizer, stabilizer, and dye are mixed by a printing sheet machine in a specific proportion; through an appropriate mix-refined molding machine (such as rolling machine), the polyvinyl chloride mixture therein is completely plasticized and melted; a calender (160° C.~240° C.) with a controlled roll clearance thereof is utilized thereafter to obtain a polyvinyl chloride transparent plastic sheet with a width of 74" and a thickness of 0.40 mm.
2. The said plastic sheet is printed with red and blue two plates of parallel straight lines thereon by a Gravure printing machine; the width of the lines is 0.1~0.6 mm and the pitch of the lines is 0.1~0.6 mm. The said plastic sheet shrinkages 1~8% after being printed. The printed surface of the plastic sheet is then embossed with parallel intermittent straight indentions by a embossing machine thereon. The pitch of the straight indentions is 0.1~0.6 mm. The producing speed of the printing machine is 10~20 yards/min. The temperature is controlled at 140° C.~180° C.
3. This example is a straight line printing (single color or multiple color) and straight indention. The surface of the transparent plastic sheet is printed, then embossed on the printed surface. The effect is that an observer can obtain different printing colors changing effect from different viewing angles, shown as FIG. 1.

Embodiment 2

1. The raw materials PVC powder, plasticizer, stabilizer, and dye are mixed by a printing sheet machine in a specific proportion; through an appropriate mix-refined molding machine (such as rolling machine), the polyvinyl chloride mixture therein is completely plasticized and melted; a calender (160° C.~240° C.) with a controlled roll clearance thereof is utilized thereafter to obtain a polyvinyl chloride transparent plastic sheet with a width of 54" and a thickness of 0.40 mm.
2. The printing copper roll is sculptured with parallel intermittent blank straight lines. The pitch of the lines is about 0.1~0.6 mm. The said transparent plastic sheet is printed the said pattern thereon by Gravure printing machine. The printed plastic sheet is transferred to the embossing machine to emboss parallel intermittent straight indentions on the opposite side of the printed side. The pitch of the straight indentions is 0.1~0.6 mm. The producing speed of the embossing machine is 10~20 yards/min. The temperature is controlled at 140° C.~180° C. The printing surface is shaded with a layer of PET dielectric (the thickness is 0.012~0.075 mm) to prevent the heater of the preheating roll from being contaminated by printing ink during embossing. The said PET dielectric layer shall be peeled off after embossing.
3. This example is a straight line printing (single color or multiple color) and straight indention. The surface of the transparent plastic sheet is printed, then embossed on the printed surface. The effect is that an observer can obtain different printing colors changing effect from different viewing angles; besides, by utilizing the density of the print straight lines, which contributes to the interposition with the straight indentions, a 3D stereo effect is thereby produced.

Embodiment 3

1. The raw materials PVC powder, plasticizer, stabilizer, and dye are mixed by a printing sheet machine in a specific proportion; through an appropriate mix-refined molding machine (such as rolling machine), the polyvinyl chloride mixture therein is completely plasticized and melted; a calender (160° C.~240° C.) with a controlled roll clearance thereof is utilized thereafter to obtain a polyvinyl chloride transparent plastic sheet with a width of 72" and a thickness of 0.4 mm.
2. The said plastic sheet is printed with red and blue two plates of parallel straight lines thereon by a Gravure printing machine; the width of the lines is 0.1~0.6 mm and the pitch of the lines is 0.1~0.6 mm. The opposite side of the printed surface of the plastic sheet is then embossed with parallel intermittent straight indentions by a embossing machine. The pitch of the straight indentions is 0.1~0.6 mm. Small sand points are designed outside the pattern. The producing speed of the embossing machine is 10~20 yards/min. The temperature is controlled at 140° C.~180° C. The printing surface is shaded with a layer of PET dielectric (0.012~0.075 mm) to prevent the heater of the preheating roll from being contaminated by printing ink during embossing. The said PET dielectric layer shall be peeled off after embossing.
3. This example is straight line printing and straight line embossing indentions, however, the embossing indentions can change in pattern design. The printing surface is totally printed with single color or multi-color straight lines. The embossing has the pattern of straight line indentions; the shown color changing effect is the same with that of practice example 2. The area of the small sand point indentions can not show color owing to the refraction of the light which, as a result, reveals the color changing at the area of pattern indentions, shown as FIG. 3.

Embodiment 4

1. The raw materials PVC powder, plasticizer, stabilizer, and dye are mixed by a printing sheet machine in a specific proportion; through an appropriate mix-refined molding machine (such as rolling machine), the polyvinyl chloride mixture therein is completely plasticized and melted; a calender (160° C.~240° C.) with a controlled roll clearance thereof is utilized thereafter to obtain a roll-up packaged polyvinyl chloride plastic sheet with a width of 72" and a thickness of 0.40 mm.

2. The design patterns are designed to be three kinds of pitches (0.5 mm, 0.48 mm, 0.52 mm) of intermittent straight indention lines in accordance with different blocks. The designed pattern is then sculptured on the printing roll; the plastic sheet is printed with the said pattern on Gravure printing machine thereafter. The opposite side of the printed surface of the plastic sheet is then embossed with parallel intermittent straight indentions by an embossing machine. The pitch of the straight indentions is 0.1~0.6 mm. Small sand points are designed outside the pattern. The producing speed of the embossing machine is 10~20 yards/min. The temperature is controlled at 140° C.~180° C. The printing surface is shaded with a layer of PET dielectric (0.012~0.075 mm) to prevent the heater of the preheating roll from being contaminated by printing ink during embossing. The said PET dielectric layer shall be peeled off after embossing. This is a straight line embossing indention. By using printing indention design to have the pattern be in different density of lines (can be single color or multiple colors), a 3D stereo effect with different depth is thus produced, shown as FIG. 4.

Embodiment 5

1. The raw materials PVC powder, plasticizer, stabilizer, and dye are mixed by a printing sheet machine in a specific proportion; through an appropriate mix-refined molding machine (such as rolling machine), the polyvinyl chloride mixture therein is completely plasticized and melted; a calender (160° C.~240° C.) with a controlled roll clearance thereof is utilized thereafter to obtain a roll-up packaged polyvinyl chloride super transparent plastic sheet with a width of 54" and a thickness of 0.40 mm.

2. Printing: The design patterns are designed to be three kinds of different continuous printing circle checkered point block according to the dimension of the dot figure—The diameter of the circle checkered point in the first block is 0.1~1.0 mm; the dot pitch of which is 0.03~0.50 mm. The diameter and pitch of the circle checkered point in the second block are those in the first block be enlarged 2~8%. The diameter and pitch of the circle checkered point in the thired block are those in the first block be reduced 2~8%. The designed pattern is then sculptured on the printing roll; the said plastic sheet is printed with the said pattern on Gravure printing machine thereafter.

3. Embossing: An embossing roll with totally continuous circle concave points is produced; the diameter of the circle point is 0.1~1.0 mm, the pitch of the point is 0.03~0.5 mm. The opposite side of the printed surface of the printed super transparent plastic sheet is then embossed with circle concave point indentions by an embossing machine. The producing speed of the embossing machine is 10~20 yards/min. The temperature is controlled at 140° C.~180° C. The printing surface is shaded with a layer of PET dielectric (the thickness is 0.012 mm~0.075 mm) to prevent the heater of the preheating roll from being contaminated by printing ink during embossing. The said PET dielectric layer shall be peeled off after embossing. This example (shown as sample 4) is utilizing emboss pattern indention, print checkered points pattern dimension, and density changing refracted by light to create interposition so as to produce 3D stereo effect. The shape of checkered points can be circle, triangle, quadrilateral, rhombus, ellipse and so on, shown as FIG. 5 and FIG. 5.1.

Embodiment 6

1. The raw materials PVC powder, plasticizer, stabilizer, and dye are mixed by a printing sheet machine in a specific proportion; through an appropriate mix-refined molding machine (such as rolling machine), the polyvinyl chloride mixture therein is completely plasticized and melted; a calender (160° C.~240° C.) with a controlled roll clearance thereof is utilized thereafter to obtain a roll-up packaged polyvinyl chloride transparent plastic sheet with a width of 54" and a thickness of 0.40 mm.

2. Printing: The design patterns are designed to be two kinds of different continuous printing circle checkered point block according to the dimension of the dot figure—The diameter of the circle checkered point in the first block is 0.1~1.0 mm; the dot pitch of which is 0.03~0.50 mm. The diameter and pitch of the circle checkered point in the second block are those in the first block be enlarged 2~8%. The circle checkered points of the said two blocks are designed in the same plate; the other pattern and color are designed in another plate. The said plastic sheet is printed with the said pattern by Gravure printing machine thereafter.

3. Embossing: An embossing roll with totally continuous circle concave points is produced; the diameter of the circle point is 0.1~1.0 mm, the pitch of the point is 0.03~0.50 mm. The opposite side of the printed surface of the printed transparent plastic sheet is then embossed with circle concave point indentions by an embossing machine. The producing speed of the embossing machine is 10~20 yards/min. The temperature is controlled at 140° C.~180° C. The printing surface is shaded with a layer of PET dielectric (the thickness is 0.012~0.075 mm) to prevent the heater of the preheating roll from being contaminated by printing ink during embossing. The said PET dielectric layer shall be peeled off after embossing. This example is utilizing print emboss pattern and checkered points; the pattern which is not in the circle point is printed thereafter. A different depth 3D stereo effect is produced by the changing dimension and density, which is refracted by light, of print checkered points. (Shown as FIG. 6 is a section of this example)

Embodiment 7

1. The raw materials PVC powder, plasticizer, stabilizer, and dye are mixed by a printing sheet machine in a specific proportion; through an appropriate mix-refined filter rolling machine to filter out the impurity, the polyvinyl chloride mixture therein is completely plasticized and melted; a calender (150° C.~200° C.) with a controlled roll clearance thereof is utilized thereafter to obtain a roll-up packaged polyvinyl chloride transparent plastic sheet with a width of 57" and a thickness of 0.20 mm.

2. Printing: The design patterns are designed to be a continuous print circle checkered block C1; the diameter of the print circle checkered block is K1, and the pitch of the print circle checkered block is S1. The dimension of the circle checkered point in the first block is 0.1~1.0 mm. The pitch of the points is 0.03~0.50 mm. The dimension and the pitch of the circle checkered point in the second block are those in the first block to be enlarged 2~8%. The dimension and the pitch of the circle checkered point in the third block are those in the first block to be reduced 2~8%. The said design pattern is sculptured on the printing roll; the transparent plastic sheet is printed with the said pattern by Gravure printing machine.

3. Adhere, emboss, and surface treatment: The raw materials PVC powder, plasticizer, stabilizer, and dye are mixed by a printing sheet machine in a specific proportion; through an appropriate mix-refine by a mixing machine, the 0.20 mm×57", 58 PHR~62 PHR plastic sheet (plastic skin bottom layer F1) is drawn by plastic machine under a temperature of 150° C.~1 80° C. Concurrently, the said plastic skin bottom layer F1, the paste cloth (bottom cloth A1) which has been pasted (paste layer B1), and the said printing transparent plastic sheet are adhered together, rolled up, and embossed by embossing machine under 150° C.~160° C. and then treated by a surface treatment machine with a surface treatment agent of proper luminosity and 100 mesh treatment roll and attached to the surface of the product so as to obtain high class PVC plastic skin product with a print of 3D stereo sense.

Embodiment 8

1. The raw materials PVC powder, plasticizer, stabilizer, and dye are mixed by a printing sheet machine in a specific proportion; through an appropriate mix-refined filter rolling machine to filter out the impurity, the polyvinyl chloride mixture therein is completely plasticized and melted; a calender (150° C.~200° C.) with a controlled roll clearance the roll-up packaged polyvinyl chloride transparent plastic sheet with a width of 57" and a thickness of 0.20 mm.

2. Printing: The design patterns are designed to be a continuous print circle checkered block C1; the diameter of the print circle checkered block is K1, and the pitch of the print circle checkered block is S1. The dimension of the circle checkered point in the first block is 0.1~1.0 mm. The pitch of the points is 0.03~0.50 mm. The dimension and the pitch of the circle checkered point in the second block are those in the first block to be enlarged 2~8%. The dimension and the pitch of the circle checkered point in the third block are those in the first block to be reduced 2~8%. The said design pattern is sculptured on the printing roll; the transparent plastic sheet is printed with the said pattern by Gravure printing machine.

3. Adhere, emboss, and surface treatment:
   (a). The raw materials PVC powder, plasticizer, stabilizer, foaming agent and dye are mixed by a plastic sheet machine in a specific proportion; through the mix-refine of a mixing machine, the 0.35 mm×57.5", 50 PHR~100 PHR plastic sheet (latex skin bottom layer (foaming layer)F1) is rolled and drawn by plastic sheet machine under a temperature of 140° C.~175° C. and then is adhered to the paste cloth (bottom cloth A1) which has been pasted (paste layer B1) at the adhering stage of the plastic sheet machine so as to obtain the semi-product (shown as FIG. 8, F2+B1+A1 layers).
   (b). Moreover, the raw materials PVC powder, plasticizer, stabilizer, and dye are mixed by a plastic sheet machine in a specific proportion; through the mix machine and plastic sheet machine, the 0.20 mm×57", 40 PHR~100 PHR plastic sheet (latex skin surface layer F1) is rolled out by plastic sheet machine under a temperature of 150° C.~180° C. and then is adhered to the semi-product obtained from said (a) at the plastic sheet machine and to the printing transparent plastic sheet concurrently in order to draw out the semi-product (shown as FIG. 8, F1+F2+B1+A1 layers).
   (c). The semi-product obtained from (b) is transferred to foaming machine so as to decompose the foaming agent obtained from the semi-product layer of (a) to nitrogen gas under the temperature of 190° C.~250° C. in order to increase the thickness of the product, improve touch feeling, and then is embossed at the rear stage of foaming machine. The surface structure of the utilized embossing roll is: the diameter of the embossed point 0.1~1.0 mm, the pitch of embossed point P1 0.03~0.50 mm. Moreover, being treated by a surface treatment with a surface treatment agent of 100 mesh treatment roll and then attached to the surface of the product, the product of a high class PVC foaming latex skin with a print of 3D stereo sense can be obtained. Shown as FIG. 8.

What is claimed is:

1. A process for producing a plastic sheet comprising:

generating a printed pattern with a computer;

printing said printed pattern onto a first surface of a plastic sheet using a printing machine;

embossing an embossed pattern onto a second surface of said plastic sheet using an embossing machine; and aligning said embossed pattern and said printed pattern to produce a coordinated visual effect.

2. A process for producing a plastic sheet as defined in claim 1 wherein said coordinated visual effect comprises an apparently 3-dimensional image.

3. A process for producing a plastic sheet as defined in claim 1 wherein said coordinated visual effect includes displaying a plurality of different colors depending upon an angle of observation of said first surface taken with respect to said first surface.

4. A process for producing a plastic sheet as defined in claim 1 wherein said embossing an embossed pattern onto said second surface comprises:

forming a plurality of substantially linear grooves in said second surface.

5. A process for producing a plastic sheet as defined in claim 1 wherein said embossing an embossed pattern onto said second surface comprises:

forming a plurality of substantially hemispherical features on said second surface.

6. A process for producing a plastic sheet as defined in claim 5 wherein said plurality of substantially hemispherical features include the plurality of convex features taken with respect to said second surface.

7. A process for producing a plastic sheet as defined in claim 5 wherein said plurality of substantially hemispherical features include the plurality of concave features taken with respect to said second surface.

8. A process of producing a plastic sheet as defined in claim 1 wherein said printing a printed pattern onto a first surface comprises:

offset printing said printed pattern onto said first surface.

9. A process of producing a plastic sheet as defined in claim 1 wherein said printing a printed pattern onto a first surface comprises:

gravure printing said printed pattern onto said first surface.

10. A process of producing a plastic sheet as defined in claim 1 wherein said plastic sheet comprises a thermoplastic.

11. A process of producing a plastic sheet as defined in claim 10 wherein said thermoplastic comprises polyvinyl chloride.

12. A process of producing a plastic sheet as defined in claim 10 wherein said thermoplastic comprises polyethylene.

13. A process of producing a plastic sheet as defined in claim 10 wherein said thermoplastic comprises ethylene vinyl acetate copolymer.

14. A process of producing a plastic sheet as defined in claim 1 further comprising:
   running a program within said computer, said program adapted to compensate for a dimensional change of said plastic sheet, said dimensional change occurring during said process of producing said plastic.

15. A process for producing a plastic sheet as defined in claim 1 wherein said first and second surfaces are coincident with one another.

16. A process for producing a plastic sheet as defined in claim 1 wherein said first and second surfaces are disposed in substantially parallel spaced relation to one another.

17. A process for producing a plastic sheet as defined in claim 1 further comprising:
   adhering said plastic sheet to a fabric sheet.

18. A process for producing a plastic sheet as defined in claim 17 wherein said fabric sheet comprises:
   a non-woven fabric material.

19. A process for producing a plastic sheet comprising:
   generating an embossed pattern with a computer;
   printing a printed pattern onto a first surface of a plastic sheet using a printing machine;
   embossing said embossed pattern onto a second surface of said plastic sheet using an embossing machine; and
   aligning said embossed pattern and said printed pattern to produce a coordinated visual effect.

* * * * *